(12) United States Patent
Miyoshi et al.

(10) Patent No.: US 12,314,807 B2
(45) Date of Patent: May 27, 2025

(54) METHOD OF GENERATING SPECIFIC INFORMATION ON SEMICONDUCTOR DEVICE, METHOD OF MANAGING SPECIFIC INFORMATION ON SEMICONDUCTOR DEVICE, AND MANUFACTURING APPARATUS FOR SEMICONDUCTOR DEVICE

(71) Applicant: Mitsubishi Electric Corporation, Tokyo (JP)

(72) Inventors: Hiroshi Miyoshi, Tokyo (JP); Noriyuki Yabuoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/409,592

(22) Filed: Jan. 10, 2024

(65) Prior Publication Data

US 2024/0289570 A1 Aug. 29, 2024

(30) Foreign Application Priority Data

Feb. 28, 2023 (JP) .................................. 2023-029185

(51) Int. Cl.
*G06K 7/10* (2006.01)

(52) U.S. Cl.
CPC ................... *G06K 7/10722* (2013.01)

(58) Field of Classification Search
CPC ..................... G06K 7/10722; H01L 23/544
See application file for complete search history.

(56) References Cited

U.S. PATENT DOCUMENTS

2006/0187719 A1 8/2006 Matsumoto et al.

FOREIGN PATENT DOCUMENTS

FR 2968455 A1 * 6/2012 ........... H01L 23/544
JP 2006-190840 A 7/2006

* cited by examiner

*Primary Examiner* — Laura A Gudorf
(74) *Attorney, Agent, or Firm* — Studebaker Brackett PLLC

(57) ABSTRACT

Specific information is extracted from a semiconductor device in a method with greater versatility. A first reading region on a metal film included in the semiconductor device is identified based on a base point defined on the semiconductor device. A predefined number of largest grains in size are extracted from the first reading region. A second reading region smaller than the first reading region is identified based on a reference point defined from positions of the extracted grains. The specific information on the semiconductor device is generated based on information extracted from appearances of grains in the second reading region.

8 Claims, 14 Drawing Sheets

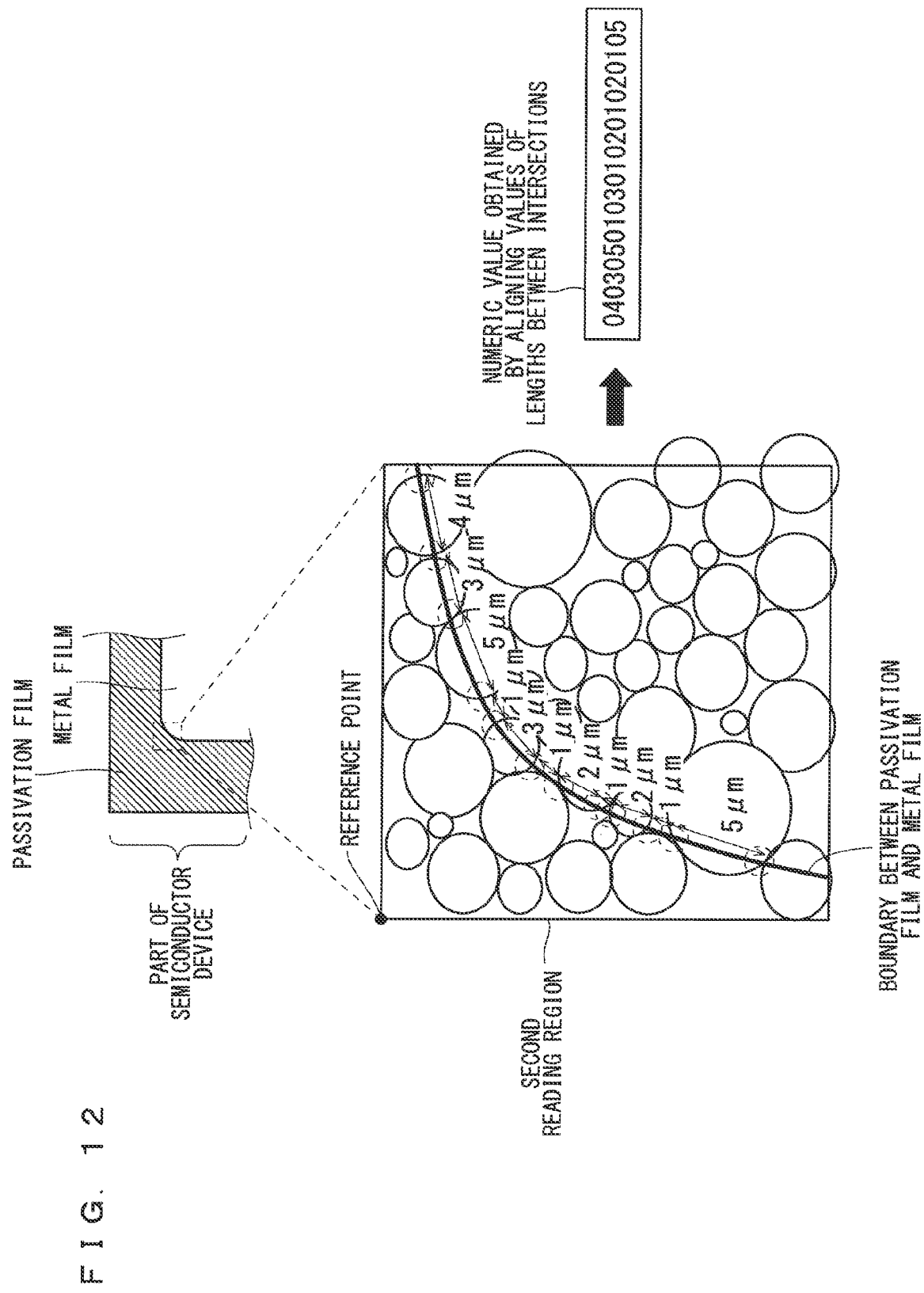
F I G. 1 2

METHOD OF GENERATING SPECIFIC INFORMATION ON SEMICONDUCTOR DEVICE, METHOD OF MANAGING SPECIFIC INFORMATION ON SEMICONDUCTOR DEVICE, AND MANUFACTURING APPARATUS FOR SEMICONDUCTOR DEVICE

BACKGROUND OF THE INVENTION

Field of the Invention

The present disclosure relates to generating and managing of specific information for each semiconductor device.

Description of the Background Art

In manufacturing a semiconductor device, unique manufacturing process information (hereinafter referred to as "specific information") is left in each chip of the semiconductor device to ensure traceability of the chip even after a step of dicing a wafer, for example, in a method of imprinting a serial number on each chip, a method of forming a unique mark on each chip by a single mask step (a step of batch processing a plurality of chips in a wafer using a single mask), or a method of mounting a storage element (e.g., a fuse or a memory element) on the semiconductor device and storing a serial number in the storage element. Introduction of these methods requires addition of steps for leaving specific information in chips, such as a step of imprinting the information on chips, a step of creating a special mask with a unique mark (pattern) for each chip, and a step of forming a storage element.

For example, Japanese Patent Application Laid-Open No. 2006-190840 discloses a technology for forming, on a chip in advance, a reading region on which a metal film is exposed, and using the shape of a grain boundary in the reading region as specific information on the chip. Since the specific information is not left in the chip but extracted from the chip according to this technology, the aforementioned addition of steps is not necessary.

S The technology of the aforementioned document, however, has less versatility because of the requirement of forming the reading region on the chip in advance.

SUMMARY

The object of the present disclosure is to extract specific information from a semiconductor device in a method with greater versatility.

A method of generating specific information on a semiconductor device according to the present disclosure includes a first reading region identifying step, a grain extracting step, and a second reading region identifying step. The first reading region identifying step is a step of identifying a first reading region on a metal film included in the semiconductor device, based on a base point defined on the semiconductor device. The grain extracting step is a step of extracting a predefined number of largest grains in size from the first reading region. The second reading region identifying step is a step of identifying a second reading region smaller than the first reading region, based on a reference point defined from positions of the predefined number of grains extracted in the grain extracting step. The specific information on the semiconductor device is generated based on information extracted from appearances of grains in the second reading region.

Since extraction of the specific information does not require any change in the structure of the semiconductor device according to the present disclosure, the specific information can be extracted from the semiconductor device in the method with greater versatility.

These and other objects, features, aspects, and advantages of the present invention will become more apparent from the following detailed description of the present invention when taken in conjunction with the accompanying drawings.

BRIEF DESCRIPTION OF THE DRAWINGS

FIG. 12 illustrates a method of generating specific information on a chip according to Embodiment 3.

DESCRIPTION OF THE PREFERRED EMBODIMENTS

Embodiment 1

Figure 1:
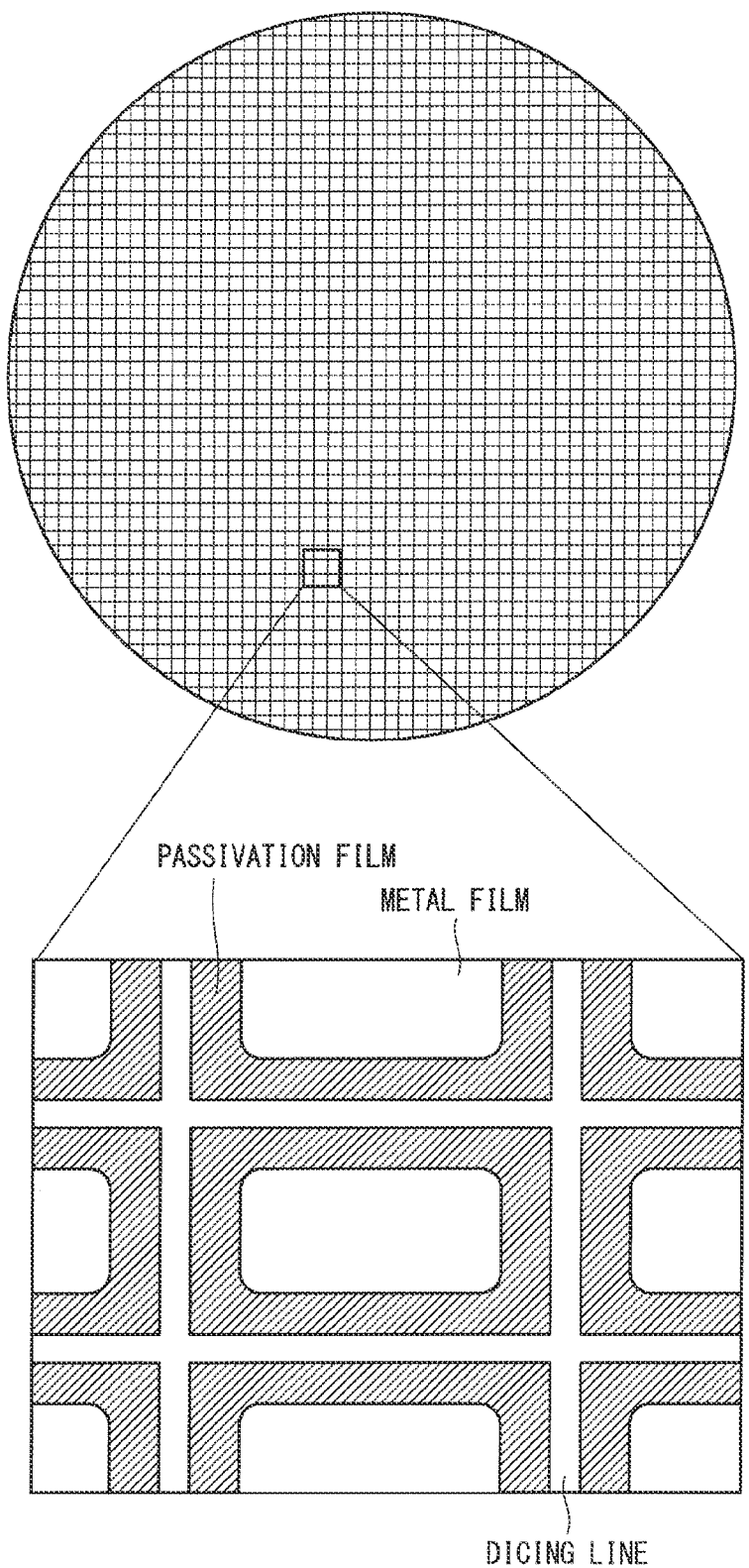
FIG. 1 is a plan view illustrating an example semiconductor substrate according to Embodiment 1.

A method of manufacturing a semiconductor device according to Embodiment 1 will be described.

First, a semiconductor substrate is prepared as a wafer. A concentration of impurities contained in the semiconductor substrate to be prepared is appropriately selected according to a breakdown voltage of a semiconductor device to be manufactured. According to Embodiment 1, a semiconductor substrate made of n-type silicon (Si) is prepared. However, a p-type semiconductor substrate may be used. In such a case, the conductivity type of each region to be formed through, for example, ion implantation or epitaxial growth may be reversed to that of the n-type semiconductor substrate.

Next, chip regions to be products of semiconductor devices and dicing lines enclosing the chip regions are formed through, for example, ion implantation or epitaxial growth. Each of the chip regions includes an active region through which a main current flows, and a terminal region that is formed around the active region and maintains the breakdown voltage of the semiconductor device. A known breakdown voltage maintaining structure can be appropriately selected and set to the terminal region.

A surface electrode including a metal film patterned by, for example, etching using a mask and made of aluminum is formed on a first main surface that is one main surface of the semiconductor substrate. The surface electrode is formed by, for example, depositing an alloy of aluminum and silicon (an Al—Si based alloy) by sputtering or vapor deposition such as physical vapor deposition (PVD).

The surface electrode may be a metal film with a laminated structure obtained by further forming, on the alloy of aluminum and silicon formed by PVD, a nickel alloy (Ni alloy) or gold (Au) by electroless plating or electroplating. When a surface electrode is formed by plating, the surface electrode can be a thick metal film. This can lead to an increase in the heat capacity of the surface electrode, and improve the heat resistance. A plating process for forming a nickel alloy on the alloy of aluminum and silicon may be performed after a second main surface that is the other main surface of the semiconductor substrate is treated.

Before forming a surface electrode, a barrier metal may be formed on the first main surface of the semiconductor substrate to form the barrier metal on a lower surface of the surface electrode. The barrier metal can be formed by depositing, for example, titanium or titanium nitride by PVD or chemical vapor deposition (CVD).

A passivation film that is a surface protective film may be selectively formed on the active region or the terminal region on the first main surface of the semiconductor substrate as necessary. The passivation film is formed of organic matters whose conductivity or refractive index is controlled, such as silicon nitride, polyimide, or polybenzoxazoles.

A metal film may be formed on the second main surface of the semiconductor substrate as a rear electrode. The rear electrode can be formed by depositing, for example, an alloy of aluminum and silicon or titanium by sputtering or vapor deposition such as PVD. Furthermore, a metal film having a laminated structure consisting of two or more of an alloy of aluminum and silicon, titanium, nickel, gold, etc., may be the rear electrode. The rear electrode may be a metal film having a laminated structure which is obtained by forming, on the metal film formed by PVD, a metal film by electroless plating or electroplating.

Semiconductor elements formed in a semiconductor device include power semiconductor elements (e.g., a diode element and a switching element) and elements in an integrated circuit. For example, when the semiconductor element is a switching element, a gate electrode is disposed in the active region as a control electrode, and receives a gate signal for controlling ON and OFF of the switching element. The structure of the gate electrode may be of the planar type or the trench type. The gate electrode is electrically connected to a gate pad that is a control pad, and the control pad receives a gate signal from outside.

The semiconductor device may include a current sense pad, a Kelvin source pad, and a temperature sensing diode pad as control pads other than the gate pad. The current sense pad is a control pad for detecting a current flowing through a cell region in which a switching element is formed. The current sense pad is electrically connected to a part of the cell region so as to allow a fraction to one several ten-thousandth of the current flowing through the whole cell region to flow through the current sense pad. The Kelvin source pad is a control pad to which a gate drive voltage for controlling ON and OFF of the switching element is applied. The temperature sensing diode pad is a control pad electrically connected to an anode and a cathode of a temperature sensing diode disposed in the semiconductor device, and is used for measuring the temperature of a semiconductor element. The control pads may be disposed at any positions. For example, a control pad region may be disposed adjacent to the active region or in the active region. The technology of the present disclosure to be described later is applicable to a metal film included in each of the control pads.

Figure 2:
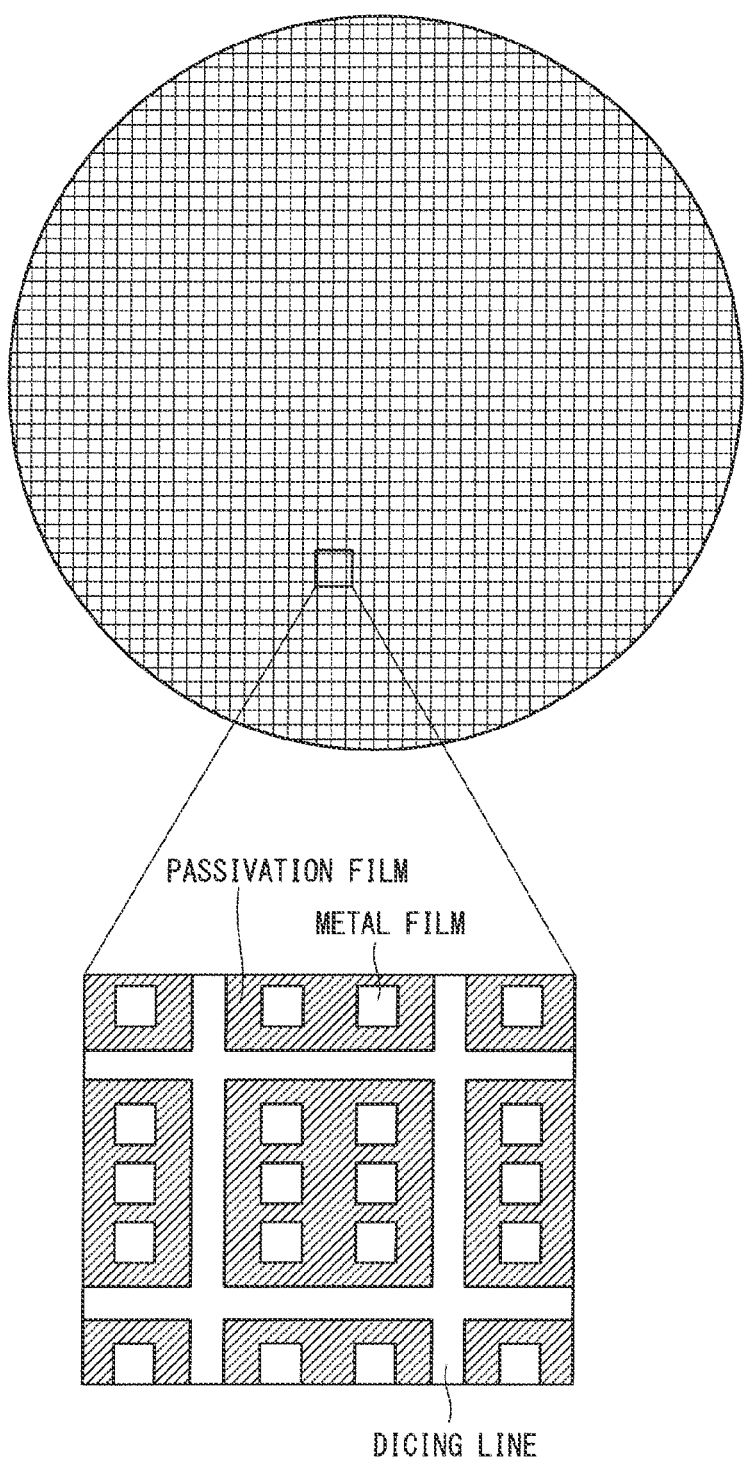
FIG. 2 is a plan view illustrating an example semiconductor substrate according to Embodiment 1.
Figure 3:
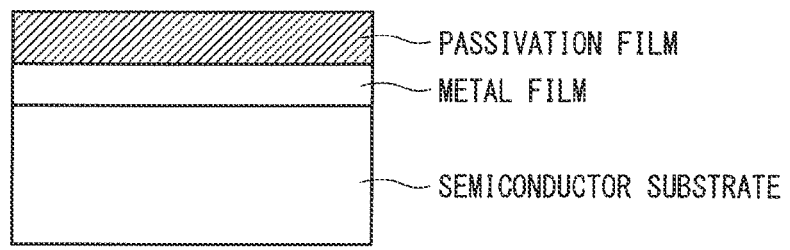
FIG. 3 is a cross-sectional view of a part of a semiconductor device according to Embodiment 1.

FIGS. 1 to 3 each illustrate an example structure of a semiconductor substrate (i.e., a semiconductor substrate to be diced) as a wafer in which semiconductor elements are formed. FIGS. 1 and 2 each illustrate a top view of the semiconductor substrate. FIG. 1 also illustrates an example semiconductor device as a power semiconductor element, and FIG. 2 also illustrates an example semiconductor device as an integrated circuit. FIG. 3 is a cross-sectional view of a part of the semiconductor device illustrated in FIG. 1 or 2. After the semiconductor elements are formed as the semiconductor substrate as illustrated in FIGS. 1 to 3, dicing the semiconductor substrate along dicing lines to be singulated into chips produces semiconductor devices.

Here, a method of obtaining specific information on a semiconductor device for each chip, from the chip will be described. According to Embodiment 1, specific information for identifying each chip is generated by extracting unique characteristics on the chip from appearances of grains and encoding the characteristics. The specific information is information different for each chip, and the specific information is associated one-to-one with the chip.

Generating the specific information includes a first reading region identifying step, a grain extracting step, a second reading region identifying step, a classification step, a matrix generating step, a specific information generating step, and a database storing step to be described below.

In the first reading region identifying step, a base point is defined on a chip in a predefined method. Then, the first reading region is identified on the chip based on the base point. For example, a circumferential edge of the chip can be the base point. The first reading region can be set at any position on a region in which the metal film is formed. The first reading region is set at the same position in a chip of each of semiconductor devices of the same type. The base point may be defined at any position, for example, a corner or the center of the chip, not limited to the circumferential edge of the chip. In particular, the corner or the center of the chip hardly becomes misaligned. Thus, defining the corner or the center as the base point facilitates observation of the base point.

In the grain extracting step, grains of the metal film in the first reading region are observed through an optical microscope or a micro-area observation instrument such as a SEM. Then, the largest three grains in size (diameter) are extracted to obtain position information on these. The metal film to which a heat treatment is applied tends to increase in grain size. The larger the grain size is, the easier the observation of the grain becomes.

Figure 4:
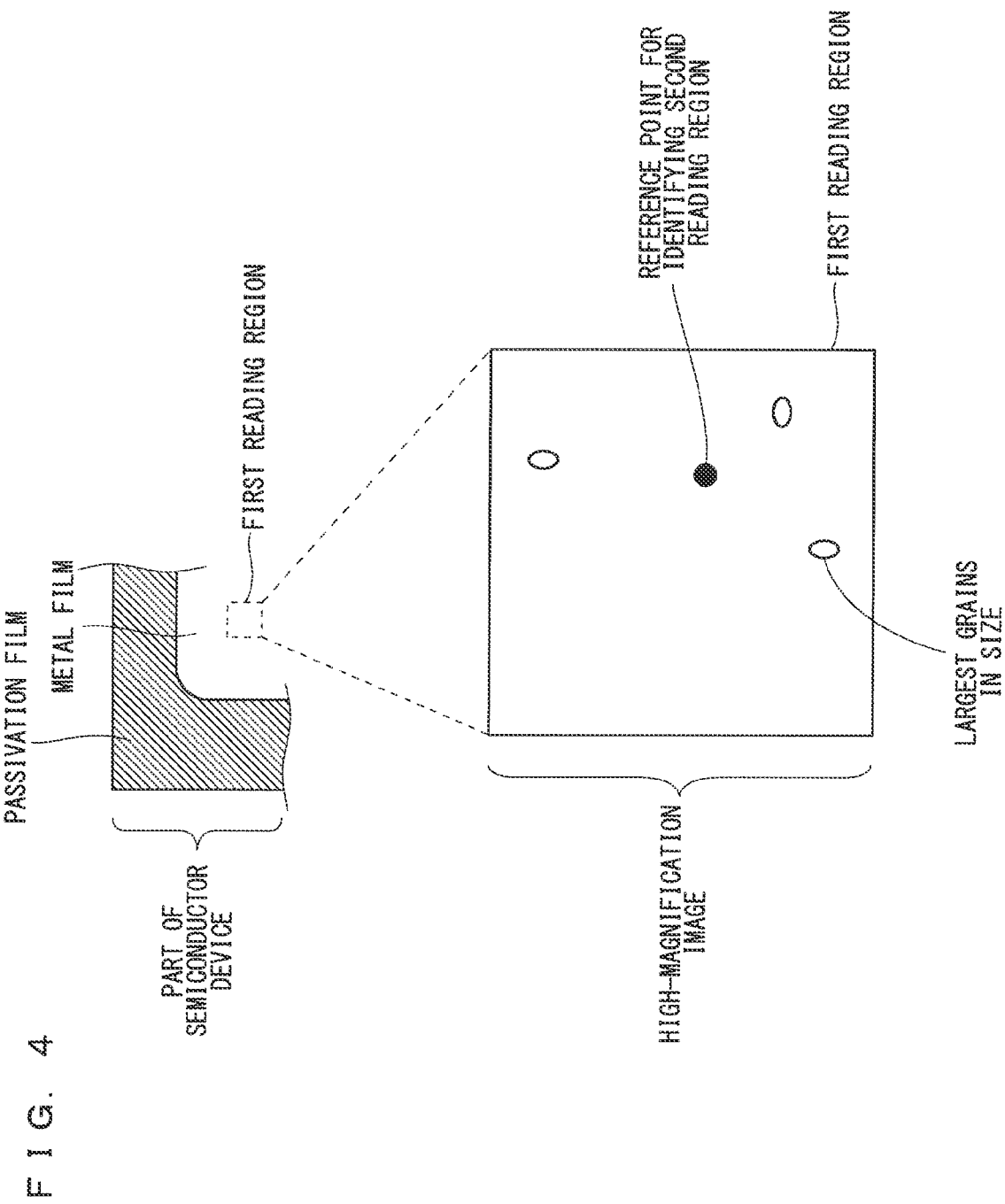
FIG. 4 illustrates a method of generating specific information on a chip according to Embodiment 1.

In the second reading region identifying step, the second reading region for extracting the specific information is identified based on a reference point defined from the positions of the largest three grains in size that have been extracted in the grain extracting step. For example, the center of gravity of a triangle whose vertices are at the positions of the largest three grains in size may be the reference point for identifying the second reading region as illustrated in FIG. 4.

The second reading region is smaller in area than the first reading region. The reason why the second reading region is smaller in area than the first reading region is because a resolution of a high-magnification image to be obtained when the second reading region is observed through, for example, an optical microscope or a SEM in the classification step to be described later is set higher than that of the first reading region.

For example, when the second reading region is set at the center of a chip, there is apprehension that the position accuracy of the second reading region may decrease because of a longer distance from the circumferential edge of the chip that is the base point to the second reading region. However, setting the second reading region in two levels (first identifying the first reading region, and then identifying the second reading region from the first reading region) as according to Embodiment 1 prevents the decrease in the position accuracy of the second reading region. Since the second reading region is identified with reference to the positions of the grains physically randomly existing, the second reading region can be identified with less misalignment and high precision.

Figure 5:
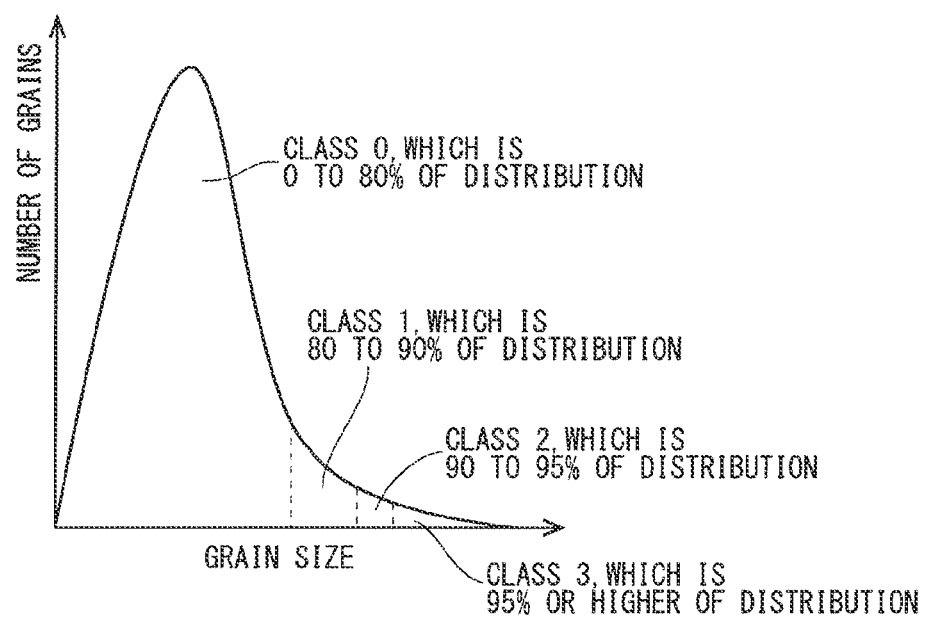
FIG. 5 illustrates the method of generating specific information on a chip according to Embodiment 1.

In the classification step, the size (diameter) of each of the grains in the second reading region is measured through, for example, an optical microscope or a SEM. Then, a distribution of the grain sizes is determined as illustrated in FIG. 5, and the grain sizes are classified based on the distribution. According to Embodiment 1, the grain sizes are classified into four levels, namely, a class 0, a class 1, a class 2, and a class 3 as illustrated in FIG. 5. Specifically, a grain size falling into a range lower than 80% of the total number of the grains is assumed to be the class 0, a grain size falling into a range higher than or equal to 80% and lower than 90% of the total is assumed to be the class 1, a grain size falling into a range higher than or equal to 90% and lower than 95% of the total is assumed to be the class 2, and a grain size falling into a range higher than or equal to 95% of the total is assumed to be the class 3 in ascending order of the sizes. Although the classification may be made in three levels or less or five levels or more, four levels are preferable in view of processing speed and precision in classifying grains.

Figure 6:
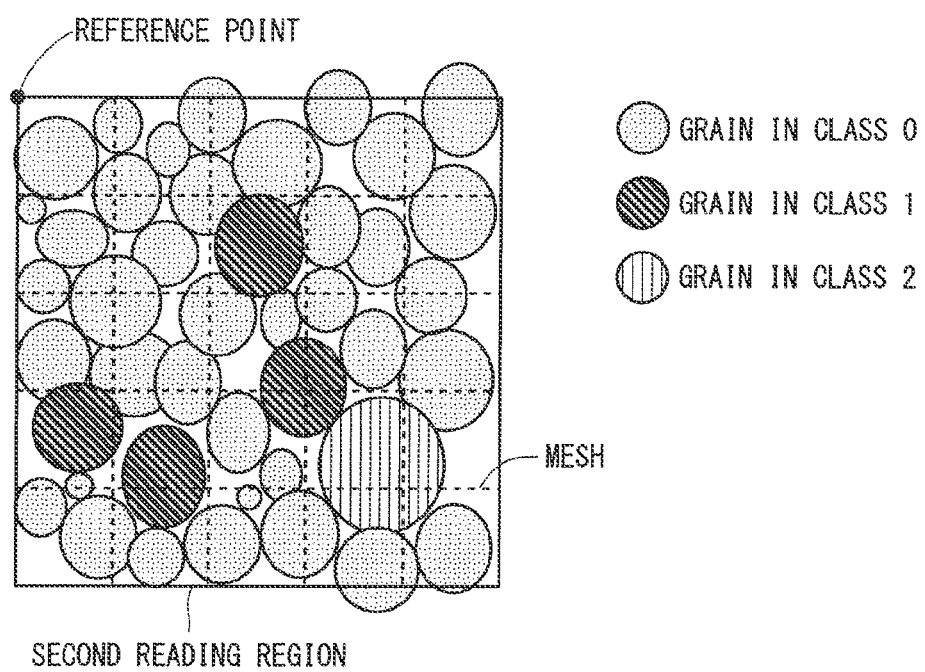
FIG. 6 illustrates the method of generating specific information on a chip according to Embodiment 1.

In the matrix generating step, the second reading region is divided into a plurality of meshes as illustrated in FIG. 6. Then, a class of the largest grain in size (hereinafter referred to as a "largest class") in each of the meshes is extracted, and a matrix indicating the largest class in each of the meshes is generated. According to Embodiment 1, the second reading region is divided into 5×5 meshes. For example, when the grains as illustrated in FIG. 6 are observed in the second reading region, a matrix of 5×5 as illustrated in FIG. 7 is generated.

As seen from FIG. 5, the size distribution of the grains tails long to the larger sizes. In other words, the grains in a region relatively larger in size vary widely in grain size. Thus, the grains in the relatively larger region are easily classified, and each of the chips is uniquely characterized by the aforementioned matrix. Using the characteristics, the matrix is generated from the extraction result of the class (largest class) of the grain that is the largest in each of the meshes.

The proper size of each of the meshes into which the second reading region is divided is a grain size of any one of the classes 1 to 3. The dimension and the number of meshes of the second reading region are appropriately set according to the proper size of the mesh. The number of meshes into which the second reading region is divided is preferably 5×5 or more so that each of the chips is uniquely identifiable.

Figure 7:
FIG. 7 illustrates the method of generating specific information on a chip according to Embodiment 1.

In the specific information generating step, a numeric value obtained by aligning, in a line, values in rows of the matrix generated in the matrix generating step is generated as specific information on the chip as illustrated in FIG. 7. In generating the specific information, adding an error correcting code to the end of each of the rows of the matrix can reduce data errors.

In the database storing step, the specific information on the chip generated in the specific information generating step and chip information on the chip are associated with each other, and stored in a database. Examples of the chip information include a lot number, a wafer number, and coordinates in a wafer.

Next, a method of obtaining, from the database, the specific information and the chip information for each chip which are stored in the database will be described. The specific information and the chip information for each chip which are stored in the database can be obtained from the database at any timing, for example, in a test step of a semiconductor device before shipping the product or when a semiconductor device shipped as a product is returned from the customer. Here, the specific information on a chip that is a target object (hereinafter referred to as a "target chip") needs to be checked with that in the database to obtain the chip information on the target chip. Checking the specific information includes a checking step and a chip information responding step to be described below.

In the checking step, the specific information on the target chip is extracted in the same method as when the specific information is generated, and is checked with the specific information stored in the database. In other words, it is confirmed whether the specific information matching the specific information on the target chip is stored in the database.

The chip information responding step is performed when the specific information matching the specific information on the target chip is stored in the database. In the chip information responding step, the chip information (a lot number, a wafer number, coordinates in a wafer, etc.) associated with the specific information matching the specific information on the target chip is read from the database, and presented to the user.

Figure 8:
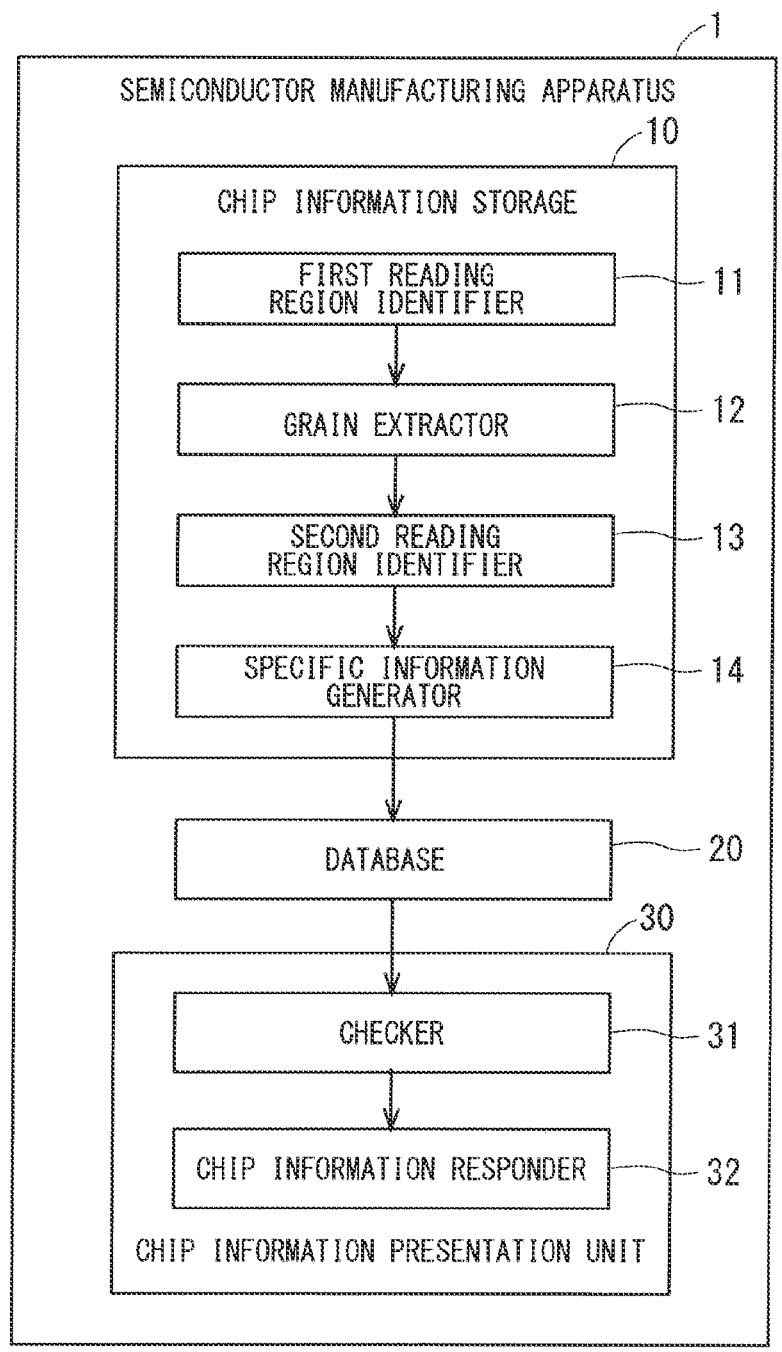
FIG. 8 illustrates a structure of a semiconductor manufacturing apparatus according to Embodiment 1.

FIG. 8 illustrates a structure of a semiconductor manufacturing apparatus 1 that is a manufacturing apparatus for a semiconductor device according to Embodiment 1. The semiconductor manufacturing apparatus 1 includes a chip information storage 10, a database 20, and a chip information presentation unit 30.

The chip information storage 10 not only generates the specific information on a chip of a semiconductor device to be manufactured, but also associates the generated specific information and the chip information on the chip with each other and stores these pieces of information in the database 20. The database 20 is a storage medium that stores the specific information and the chip information on the chip. The chip information presentation unit 30 reads the chip information on the target chip from the database 20, and presents the chip information to the user. The semiconductor manufacturing apparatus 1 with the same structure is applicable to Embodiments 2 to 4 to be described later.

As illustrated in FIG. 8, the chip information storage 10 includes a first reading region identifier 11, a grain extractor 12, a second reading region identifier 13, and a specific information generator 14.

The first reading region identifier 11 performs the first reading region identifying step on a chip of an in-process semiconductor device (hereinafter referred to as a "manufacturing chip"). In other words, the first reading region identifier 11 identifies the first reading region on the manufacturing chip.

The grain extractor 12 performs the grain extracting step on the manufacturing chip. In other words, the grain extractor 12 extracts the largest three grains in size (diameter) from the first reading region of the manufacturing chip to obtain position information on these.

The second reading region identifier 13 performs the second reading region identifying step on the manufacturing chip. In other words, the second reading region identifier 13 identifies the second reading region, based on a reference point defined from the positions of the largest three grains in size that have been extracted by the grain extractor 12.

The specific information generator 14 performs the classification step, the matrix generating step, the specific information generating step, and the database storing step on the second reading region of the manufacturing chip. In other words, the specific information generator 14 classifies the size of each of the grains in the second reading region, generates a matrix based on the largest grain size in each of the meshes of the second reading region, and generates the specific information on the manufacturing chip from the matrix. The specific information generator 14 further associates the specific information on the manufacturing chip with the chip information on the manufacturing chip, and stores the pieces of information in the database 20.

As illustrated in FIG. 8, the chip information presentation unit 30 includes a checker 31 and a chip information responder 32.

The checker 31 performs the checking step on the target chip. In other words, the checker 31 extracts the specific information on the target chip and checks the specific information on the target chip with the specific information stored by the database 20.

The chip information responder 32 performs the chip information responding step when the specific information matching the specific information of the target chip is stored by the database 20. In other words, the chip information responder 32 reads the chip information associated with the specific information matching the specific information of the target chip from the database 20, and presents the chip information to the user.

The technology according to Embodiment 1 can extract the specific information on the chip from an arbitrary position of a metal film included in the chip of the semiconductor device. Since extraction of the specific information does not require any change in the structure of the chip, the manufacturing method has greater versatility and is applicable to existing semiconductor devices.

The technology according to Embodiment 1 can set a plurality of second reading regions on one chip, from which the following advantages can be expected. First, the amount of the specific information extracted from one chip can be increased. Even when the number of chips manufactured increases, each of the chips can be uniquely identified. Even when a foreign substance or a defect in a manufacturing process makes it impossible to measure grains in a part of the second reading regions, the specific information can be extracted from another second reading region. When the plurality of second reading regions are set, a plurality of first reading regions may be set.

A region from which the specific information is extracted is identified in two levels according to the present disclosure. In other words, the first reading region is first identified, the second reading region is identified from the first reading region, and the specific information is extracted from the second reading region. Here, the region from which the specific information is extracted may be set in three or more levels. For example, it is possible to identify the first reading region, identify the second reading region from the first reading region, identify the third reading region from the second reading region, and extract the specific information from the third reading region. However, the two levels are preferable in view of preventing an increase in the number of processes.

Embodiment 2

Figure 9:
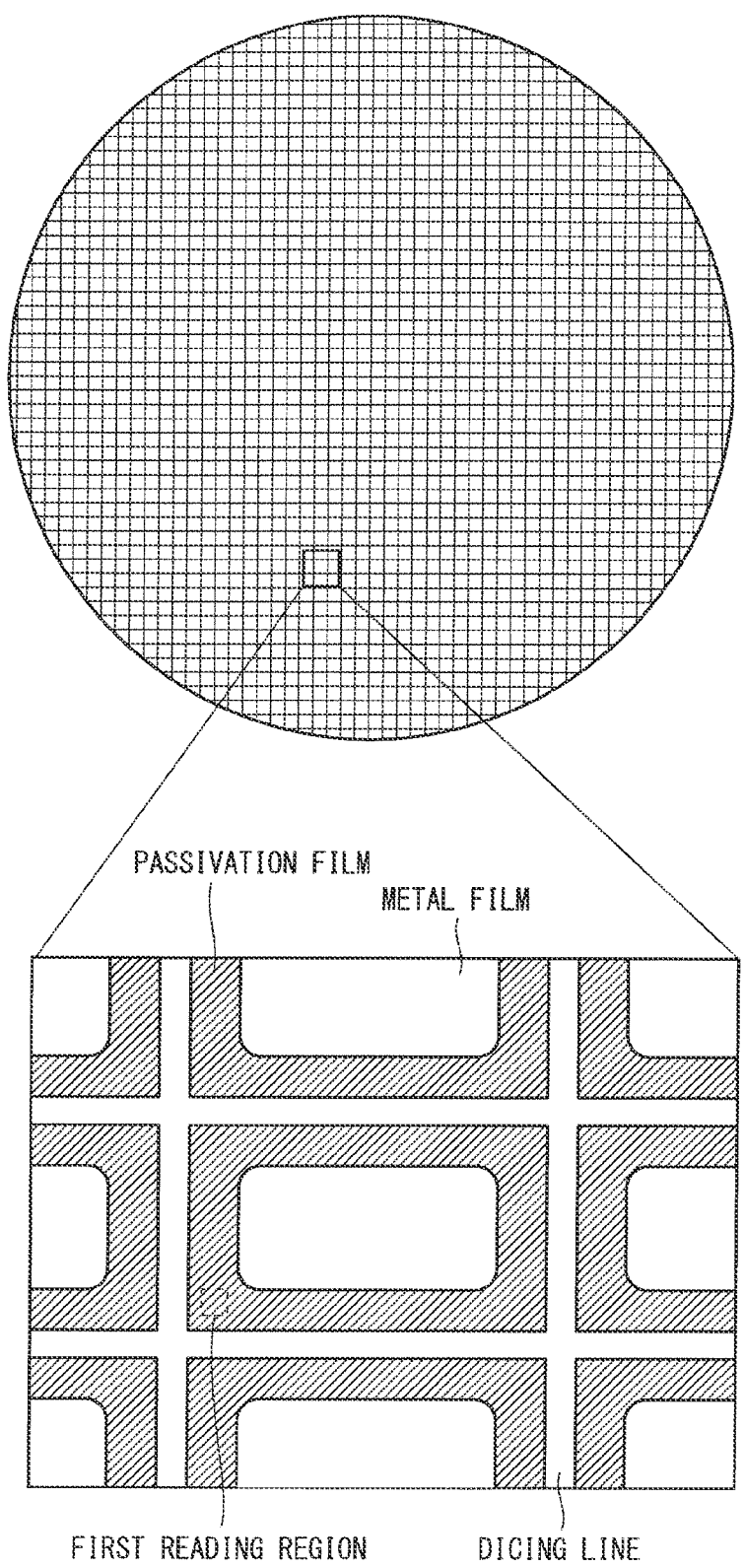
FIG. 9 is a plan view illustrating an example position of a first reading region according to Embodiment 2.
Figure 10:
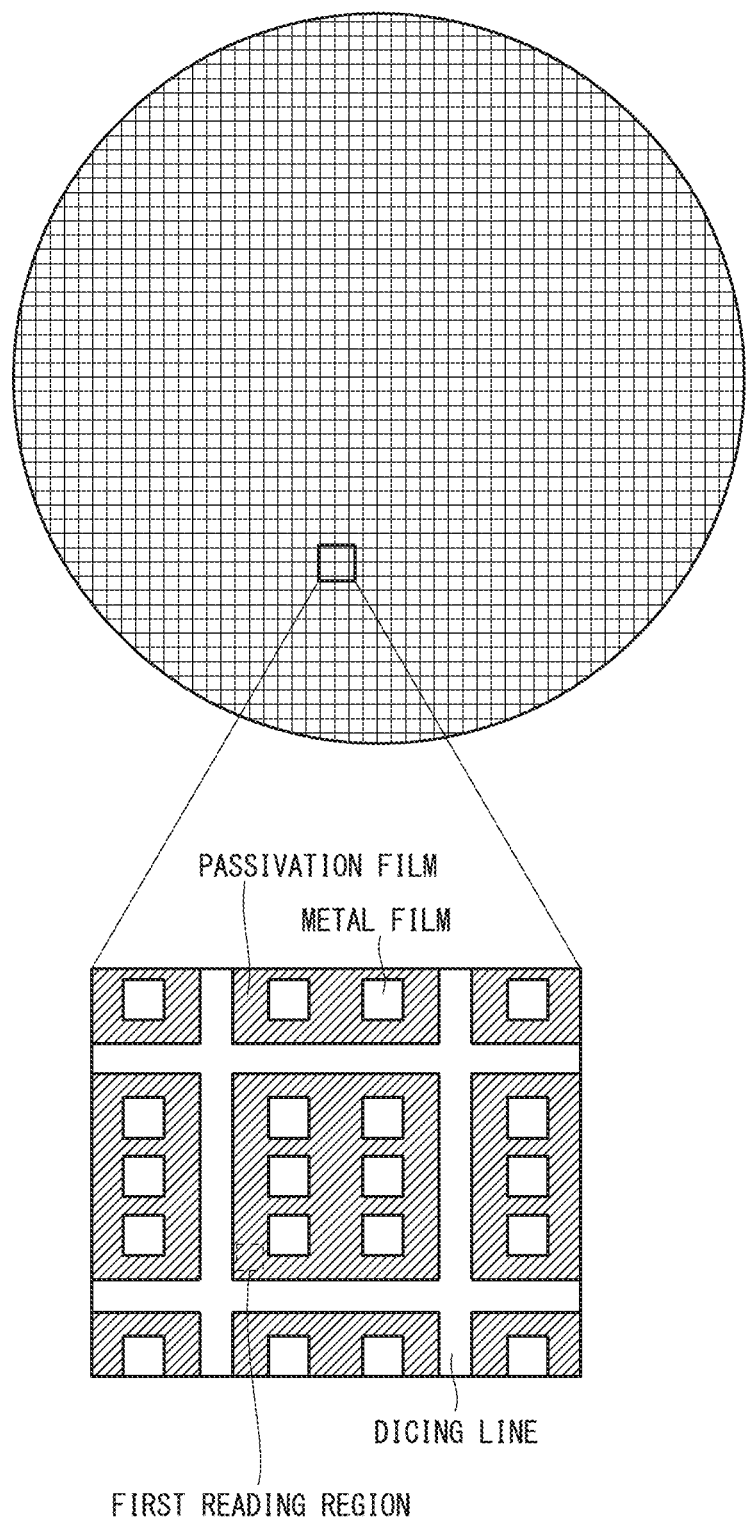
FIG. 10 is a plan view illustrating an example position of the first reading region according to Embodiment 2.
Figure 11:
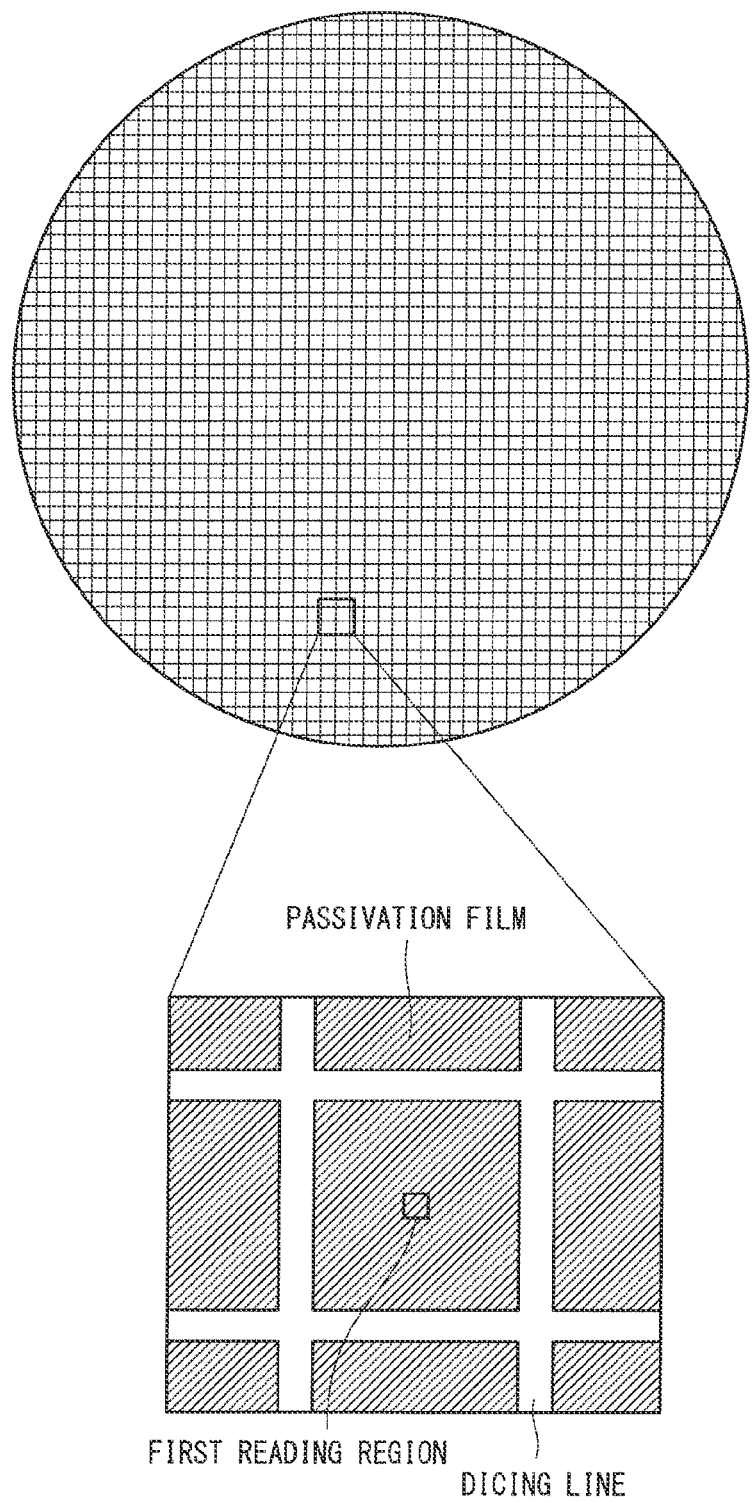
FIG. 11 is a plan view illustrating an example position of the first reading region according to Embodiment 2.

The positions of the first reading region and the second reading region are not restricted to openings of the passivation film. In Embodiment 2, the first reading region is set in a region covered with a passivation film on a metal film as illustrated in FIGS. 9, 10, and 11. Since the second reading region is identified from the first reading region, the second reading region is also set in a region covered with the passivation film on the metal film, though the illustration is omitted. Embodiment 2 is identical to Embodiment 1 except this.

The passivation film is normally a transparent or translucent material. Even when the first reading region and the second reading region are covered with the passivation film, grains of the first reading region and the second reading region can be observed.

The passivation film protects not only chips but also the surface of the metal film. For example, in a sealing step for sealing the chips with a sealant such as a resin or gel, protection of the chips by the passivation film can reduce the stress applied between the sealant and the metal film. Here, covering the first reading region and the second reading region with the passivation film can prevent the grains from being deformed due to the stress and prevent the specific information from being changed.

Embodiment 3

In Embodiment 3, the second reading region is set to include the edge of a passivation film located on a metal film as illustrated in FIG. 12. In a plan view of the second reading region, a boundary between the passivation film and the metal film crosses the second reading region.

The method of extracting the specific information from the second reading region according to Embodiment 3 is different from those according to Embodiments 1 and 2, In Embodiment 3, a plurality of intersections between the boundary and contours of the grains are extracted along the boundary between the passivation film and the metal film which crosses the second reading region. Then, the specific information is generated by aligning values of distances between the intersections and converting the values into a numeric value as illustrated in FIG. 12.

Embodiment 3 can expectedly increase the precision of extracting the specific information, using the boundary on the chip.

Embodiment 4

Figure 13:
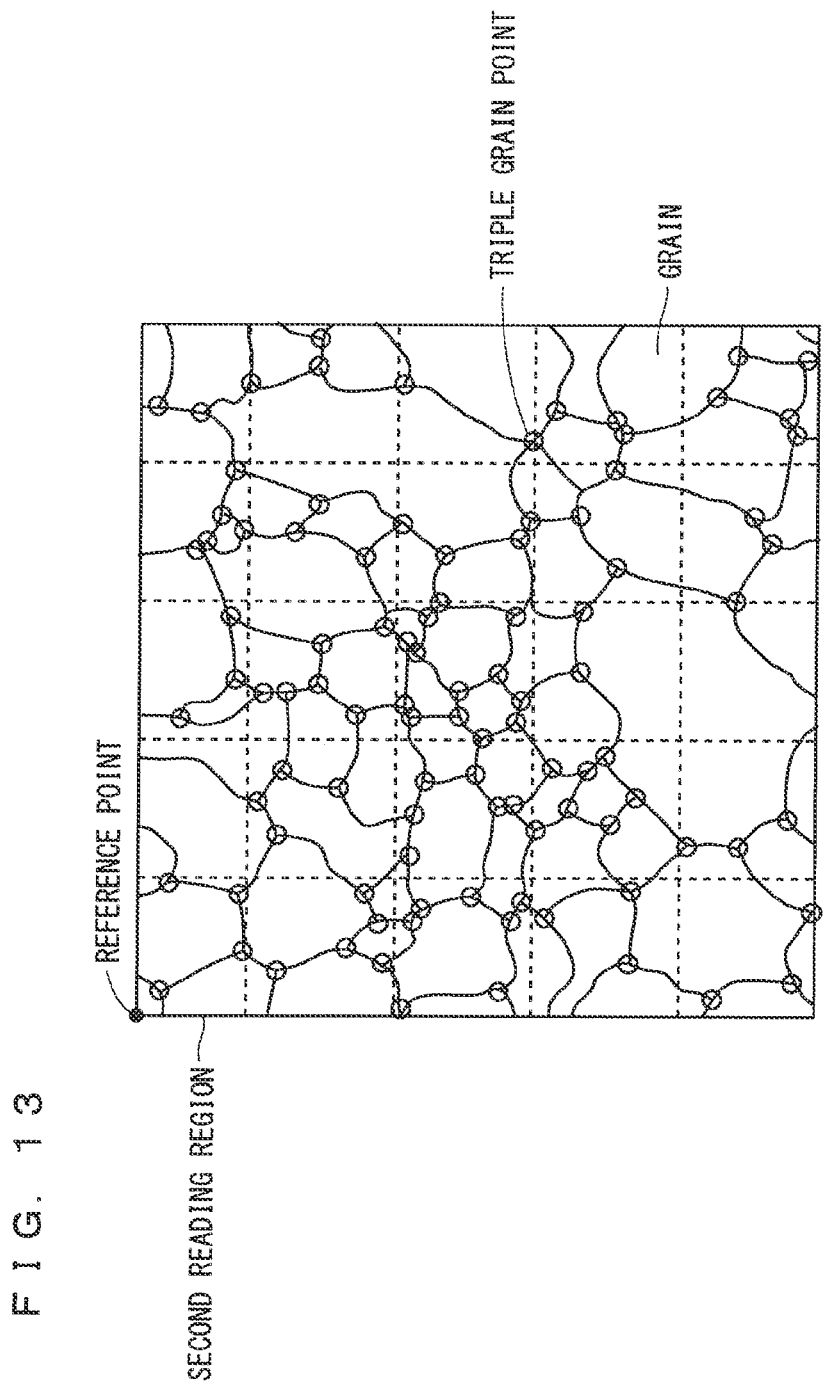
FIG. 13 illustrates a method of setting meshes in the second reading region according to Embodiment 4.
Figure 14:
FIG. 14 illustrates a method of generating specific information on a chip according to Embodiment 4.

The method of extracting the specific information from the second reading region according to Embodiment 4 is different from those according to Embodiments 1 to 3. In Embodiment 4, the second reading region is divided into a plurality of meshes. Then, triple points each in a grain boundary (a point to be a boundary of three grains) in the second reading region are extracted as illustrated in FIG. 13, and a matrix indicating the number of triple points in each of the meshes as illustrated in FIG. 14 is generated. Then, a numeric value obtained by aligning, in a line, values in rows of the matrix generated in the matrix generating step is generated as the specific information on the chip as illustrated in FIG. 14.

In general, it is difficult to detect quadruple or higher points (each point to be a boundary of four or more grains) from an image because the grain boundaries are complicated. However, the triple point that is the minimal point for forming a boundary is easily detected from an image. Embodiment 4 can expectedly increase the precision of extracting the specific information because the specific information is extracted by detecting the triple points of the grain boundaries.

Although Embodiments 1 to 4 describe silicon as a material of a semiconductor substrate, the material of the semiconductor substrate is not limited to silicon but may be, for example, a wide bandgap semiconductor with a band gap larger than silicon, such as silicon carbide, a gallium nitride-based material, a gallium oxide-based material, or diamond. Since a switching element and a diode element each made of a wide bandgap semiconductor have higher breakdown voltage properties and higher allowable current densities, the switching element and the diode element can be downsized. When the size of a chip is small, forming a unique mark (pattern) on the chip reduces an effective area of the chip. Thus, application of the technology according to the present disclosure is effective.

Embodiments can be freely combined, and each of Embodiments can be appropriately modified or omitted.

APPENDIXES

The following will describe a summary of various aspects of the present disclosure as appendixes.

Appendix 1

A method of generating specific information on a semiconductor device, the method comprising:
- a first reading region identifying step of identifying a first reading region on a metal film included in the semiconductor device, based on a base point defined on the semiconductor device;
- a grain extracting step of extracting a predefined number of largest grains in size from the first reading region;
- a second reading region identifying step of identifying a second reading region smaller than the first reading region, based on a reference point defined from positions of the predefined number of grains extracted in the grain extracting step; and
- a step of generating the specific information on the semiconductor device, based on information extracted from appearances of grains in the second reading region.

Appendix 2

The method according to appendix 1, wherein the step of generating the specific information includes:
- a classification step of classifying each of the grains in the second reading region according to a size;
- a matrix generating step of dividing the second reading region into a plurality of meshes, and generating a matrix indicating a class of a largest grain in each of the meshes; and
- a specific information generating step of generating the specific information on the semiconductor device from the matrix.

Appendix 3

The method according to appendix 1.
wherein the step of generating the specific information includes a specific information generating step of extracting, along a boundary between a passivation film and the metal film, a plurality of intersections between the boundary and contours of the grains, and generating the specific information on the semiconductor device based on distances between the intersections, the boundary crossing the second reading region.

Appendix 4

The method according to appendix 1,
wherein the step of generating the specific information includes:
- a matrix generating step of dividing the second reading region into a plurality of meshes, extracting triple points each in a grain boundary in the second reading region, and generating a matrix indicating the number of the triple points in each of the meshes; and
- a specific information generating step of generating the specific information on the semiconductor device from the matrix.

Appendix 5

The method according to any one of appendixes 1 to 4, wherein the first reading region is set in a region covered with a passivation film on the metal film.

Appendix 6

A method of managing specific information on a semiconductor device, the method comprising:
- a step of generating the specific information on the semiconductor device in the method according to any one of appendixes 1 to 5; and
- a database storing step of associating the specific information on the semiconductor device with chip information on the semiconductor device, and storing the specific information and the chip information in a database.

Appendix 7

A method of managing specific information on a semiconductor device, the method comprising:
- a checking step of generating the specific information on the semiconductor device in the method according to any one of appendixes 1 to 5, and checking the specific information on the semiconductor device with specific information stored in a database; and
- a chip information responding step of obtaining, when the specific information on the semiconductor device matches the specific information stored in the database, chip information associated with the specific information from the database, and presenting the chip information to a user.

Appendix 8

A manufacturing apparatus for a semiconductor device, the apparatus comprising:
a first reading region identifier to identify a first reading region on a metal film included in an in-process semiconductor device, based on a base point defined on the in-process semiconductor device;
a grain extractor to extract a predefined number of largest grains in size from the first reading region;
a second reading region identifier to identify a second reading region smaller than the first reading region, based on a reference point defined from positions of the predefined number of grains extracted by the grain extractor;
a specific information generator to generate specific information on the in-process semiconductor device, based on information extracted from appearances of grains in the second reading region;
a database to associate the specific information on the in-process semiconductor device with chip information on the in-process semiconductor device, and store the specific information and the chip information;
a checker to generate specific information on a semiconductor device and check the specific information on the semiconductor device with the specific information stored by the database; and
a chip information responder to obtain, when the specific information on the semiconductor device matches the specific information stored by the database, the chip information associated with the specific information from the database, and present the chip information to a user.

While the invention has been shown and described in detail, the foregoing description is in all aspects illustrative and not restrictive. It is therefore understood that numerous modifications and variations can be devised without departing from the scope of the invention.

What is claimed is:

1. A method of generating specific information on a semiconductor device, the method comprising:
identifying a first reading region on a metal film included in the semiconductor device, based on a base point defined on the semiconductor device;
extracting a predefined number of largest grains in size from the first reading region;
identifying a second reading region smaller than the first reading region, based on a reference point defined from positions of the predefined number of largest grains; and
generating the specific information on the semiconductor device, based on information extracted from appearances of grains in the second reading region.

2. The method according to claim 1,
wherein the generating includes:
classifying each of the grains in the second reading region according to a size;
dividing the second reading region into a plurality of meshes, and generating a matrix indicating a class of a largest grain in each of the meshes; and
generating the specific information on the semiconductor device from the matrix.

3. The method according to claim 1,
wherein the generating includes extracting, along a boundary between a passivation film and the metal film, a plurality of intersections between the boundary and contours of the grains, and generating the specific information on the semiconductor device based on distances between the intersections, the boundary crossing the second reading region.

4. The method according to claim 1,
wherein the generating includes:
dividing the second reading region into a plurality of meshes, extracting triple points each in a grain boundary in the second reading region, and generating a matrix indicating the number of the triple points in each of the meshes; and
generating the specific information on the semiconductor device from the matrix.

5. The method according to claim 1,
wherein the first reading region is set in a region covered with a passivation film on the metal film.

6. A method of managing specific information on a semiconductor device, the method comprising:
generating the specific information on the semiconductor device by performing all the steps of the method according to claim 1; and
associating the specific information on the semiconductor device with chip information on the semiconductor device, and storing the specific information and the chip information in a database.

7. A method of managing specific information on a semiconductor device, the method comprising:
generating the specific information on the semiconductor device by performing all the steps of the method according to claim 1, and checking the specific information on the semiconductor device with specific information stored in a database; and
obtaining, when the specific information on the semiconductor device matches the specific information stored in the database, chip information associated with the specific information from the database, and presenting the chip information to a user.

8. A manufacturing apparatus for a semiconductor device, the apparatus comprising:
a first reading region identifier to identify a first reading region on a metal film included in an in-process semiconductor device, based on a base point defined on the in-process semiconductor device;
a grain extractor to extract a predefined number of largest grains in size from the first reading region;
a second reading region identifier to identify a second reading region smaller than the first reading region, based on a reference point defined from positions of the predefined number of largest grains extracted by the grain extractor;
a specific information generator to generate specific information on the in-process semiconductor device, based on information extracted from appearances of grains in the second reading region;
a database to associate the specific information on the in-process semiconductor device with chip information on the in-process semiconductor device, and store the specific information and the chip information;
a checker to generate specific information on a semiconductor device and check the specific information on the semiconductor device with the specific information stored by the database; and
a chip information responder to obtain, when the specific information on the semiconductor device matches the specific information stored by the database, the chip information associated with the specific information from the database, and present the chip information to a user.

* * * * *